United States Patent
Krapf et al.

(10) Patent No.: US 9,975,424 B2
(45) Date of Patent: May 22, 2018

(54) DROPBOX ASSEMBLY FOR TRANSMISSION OF WORK VEHICLE

(71) Applicant: CNH Industrial America, LLC, New Holland, PA (US)

(72) Inventors: Leo Krapf, Woodridge, IL (US); Kenneth McCabe, Romeoville, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days. days.

(21) Appl. No.: 14/712,971

(22) Filed: May 15, 2015

(65) Prior Publication Data

US 2016/0332515 A1 Nov. 17, 2016

(51) Int. Cl.
*B60K 17/28* (2006.01)
*F16H 57/04* (2010.01)
*F16H 57/02* (2012.01)
*F16H 57/031* (2012.01)

(52) U.S. Cl.
CPC ............. *B60K 17/28* (2013.01); *F16H 57/02* (2013.01); *F16H 57/031* (2013.01); *F16H 57/0424* (2013.01)

(58) Field of Classification Search
CPC ....... B60K 17/28; F16H 57/02; F16H 57/031; F16H 54/0424
See application file for complete search history.

(56) References Cited

U.S. PATENT DOCUMENTS

| | | | |
|---|---|---|---|
| 4,019,404 A | 4/1977 | Schauer | |
| 4,098,144 A | 7/1978 | Besel et al. | |
| 4,121,479 A | 10/1978 | Schauer | |
| 5,724,865 A | 3/1998 | Boone | |
| 5,807,199 A | 9/1998 | Keller | |
| 6,090,005 A | 7/2000 | Schmidt et al. | |
| 6,457,560 B1 | 10/2002 | Evans et al. | |
| 6,626,053 B2 | 9/2003 | Baxter, Jr. et al. | |
| 7,069,800 B2 | 7/2006 | Knecth et al. | |

(Continued)

FOREIGN PATENT DOCUMENTS

| EP | WO 98/12064 | 3/1998 |
|---|---|---|
| EP | 0 930 981 A1 | 7/1999 |

(Continued)

OTHER PUBLICATIONS

GM Transfer Case Pump Rub Repair Photo; Gallery; URL: http://www.8-lug.com/tech/1210_8l_gm_transfer_case_pump_rub_repair/photo_01.html Figures: "See figures"(17 figs.).

(Continued)

*Primary Examiner* — Faye M Fleming
(74) *Attorney, Agent, or Firm* — Rickard K. DeMille; Rebecca L. Henkel (57) ABSTRACT

Transmissions and dropbox assemblies for transmissions of work vehicles are provided. A dropbox assembly includes a dropbox housing defining an interior, and a gear assembly disposed within the interior of the dropbox housing. The gear assembly includes an input gear and an output gear. The dropbox assembly further includes an output shaft coupled to and rotatable with the output gear, and a pump mounted to the dropbox housing. The pump includes a pump housing disposed exterior to the dropbox housing and a pump shaft, the pump shaft coupled to and rotatable with the output shaft.

25 Claims, 7 Drawing Sheets

(56) References Cited

U.S. PATENT DOCUMENTS

| | | | |
|---|---|---|---|
| 7,998,009 B2 | 8/2011 | Zhao et al. | |
| 8,050,827 B2 * | 11/2011 | Hasegawa | F16H 3/006 701/51 |
| 8,092,202 B2 | 1/2012 | Matlack | |
| 8,491,064 B2 | 7/2013 | Petersson | |
| 8,647,225 B2 | 2/2014 | Thomas et al. | |
| 8,862,349 B2 | 10/2014 | Faucett et al. | |
| 8,888,658 B2 | 11/2014 | Pritchard | |
| 9,248,737 B2 * | 2/2016 | Iwaki | B60K 17/04 |
| 2007/0144283 A1 * | 6/2007 | Hasegawa | B60K 17/04 74/325 |
| 2009/0065279 A1 * | 3/2009 | Bessho | B60K 5/04 180/242 |
| 2009/0066052 A1 * | 3/2009 | Bessho | B60G 9/022 280/124.179 |
| 2013/0323015 A1 | 12/2013 | Dewald | |
| 2014/0091023 A1 | 4/2014 | Long et al. | |

FOREIGN PATENT DOCUMENTS

| | | |
|---|---|---|
| EP | 1302704 | 4/2003 |
| EP | 2565498 | 3/2013 |
| EP | 2602515 | 6/2013 |
| EP | 2 677 210 A1 | 12/2013 |
| WO | 2010/142042 | 12/2010 |
| WO | 2014/008902 | 1/2014 |

OTHER PUBLICATIONS

European Search Report for European Application No. 16169904.6 dated Feb. 7, 2017 (13 pages).

* cited by examiner

DROPBOX ASSEMBLY FOR TRANSMISSION OF WORK VEHICLE

FIELD OF THE INVENTION

The present subject matter relates generally to work vehicles and more particularly, to transmissions of work vehicles. In particular, the present subject matter relates to dropbox-mounted pumps for use in work vehicles.

BACKGROUND OF THE INVENTION

Typically, work vehicles, such as tractors and other agricultural vehicles, have a continuously variable transmission (CVT) or a power shift transmission (PST). In many cases, a work vehicle additionally includes various hydraulic components, such as a pump for generating hydraulic flow. This hydraulic power can be utilized for various components of the work vehicle, such as hydraulically actuated clutches, etc. Further, such hydraulic power can be utilized to actuate various add-on components for a work vehicle, such as planters or seeders.

In general, a single pump is utilized in a work vehicle to generate the hydraulic power for the necessary components as discussed above, including the add-on components. However, in many cases, it may be desirable for the available hydraulic power to be increased beyond the capabilities of the presently utilized main pumps. For example, in some cases, it may be desirable to increase the hydraulic flow from between approximately 40 and approximately 45 gallons per minute to approximately 60 gallons per minute or greater.

Accordingly, improved apparatus for providing increased hydraulic power in work vehicles is desired. In particular, apparatus for providing such increased hydraulic power with minimal modifications to existing transmission components would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a dropbox assembly is provided for a transmission of a work vehicle. The dropbox assembly includes a dropbox housing defining an interior, and a gear assembly disposed within the interior of the dropbox housing. The gear assembly includes an input gear and an output gear. The dropbox assembly further includes an output shaft coupled to and rotatable with the output gear, and a pump mounted to the dropbox housing. The pump includes a pump housing disposed exterior to the dropbox housing and a pump shaft, the pump shaft coupled to and rotatable with the output shaft.

In accordance with another embodiment, a transmission is provided for a work vehicle. The transmission includes an input shaft, and a dropbox assembly. The dropbox assembly includes a dropbox housing defining an interior, and a gear assembly disposed within the interior of the dropbox housing. The gear assembly includes an input gear and an output gear, the input gear coupled to and rotatable with the input shaft. The dropbox assembly further includes an output shaft coupled to and rotatable with the output gear, and a pump mounted to the dropbox housing. The pump includes a pump housing disposed exterior to the dropbox housing and a pump shaft, the pump shaft coupled to and rotatable with the output shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
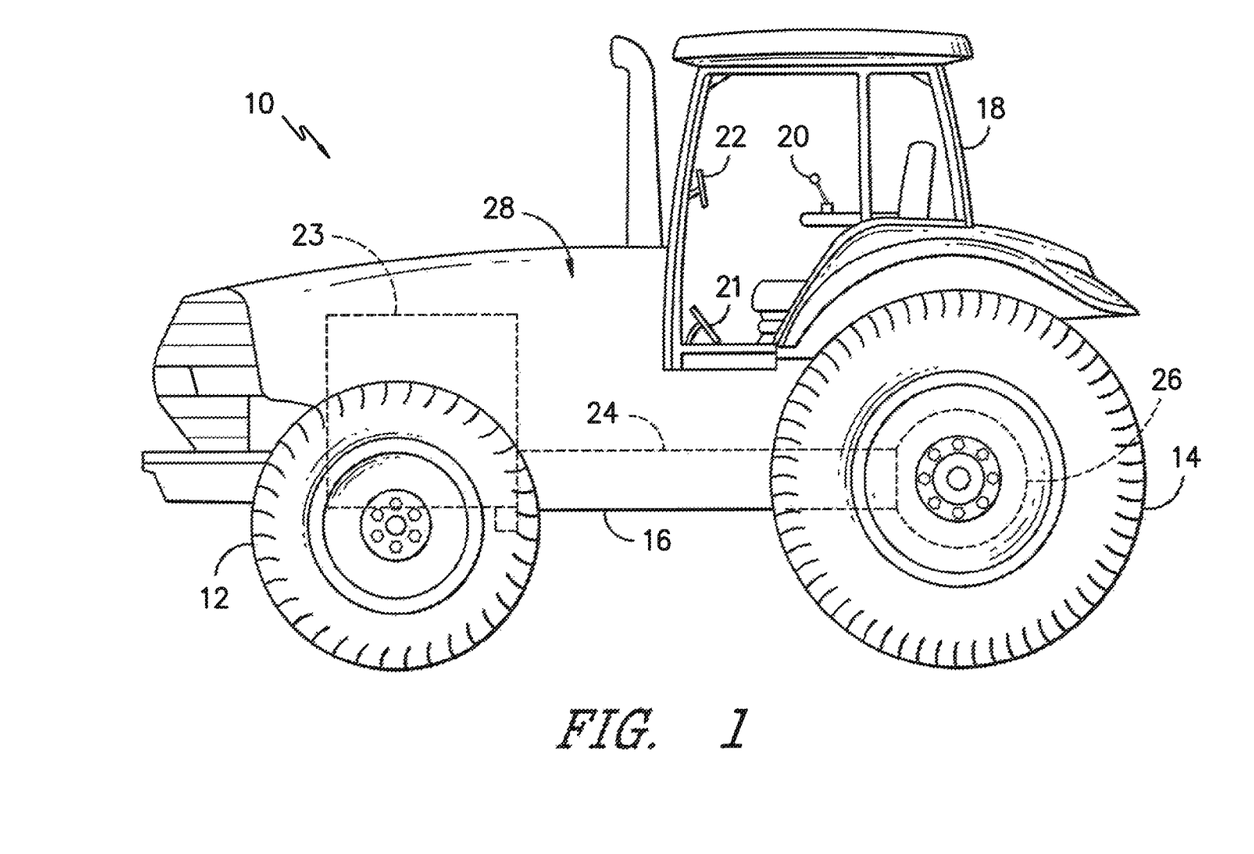
FIG. 1 illustrates a side view of a work vehicle in accordance with one embodiment of the present disclosure.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller.

Moreover, the work vehicle 10 may include an engine 23 and a transmission 24 mounted on the chassis 16. The transmission 24 may be operably coupled to the engine 23 and may provide variably adjusted gear ratios for transferring engine power to the Wheels 14 via an axle/differential 26. The engine 23, transmission 24, and axle/differential 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
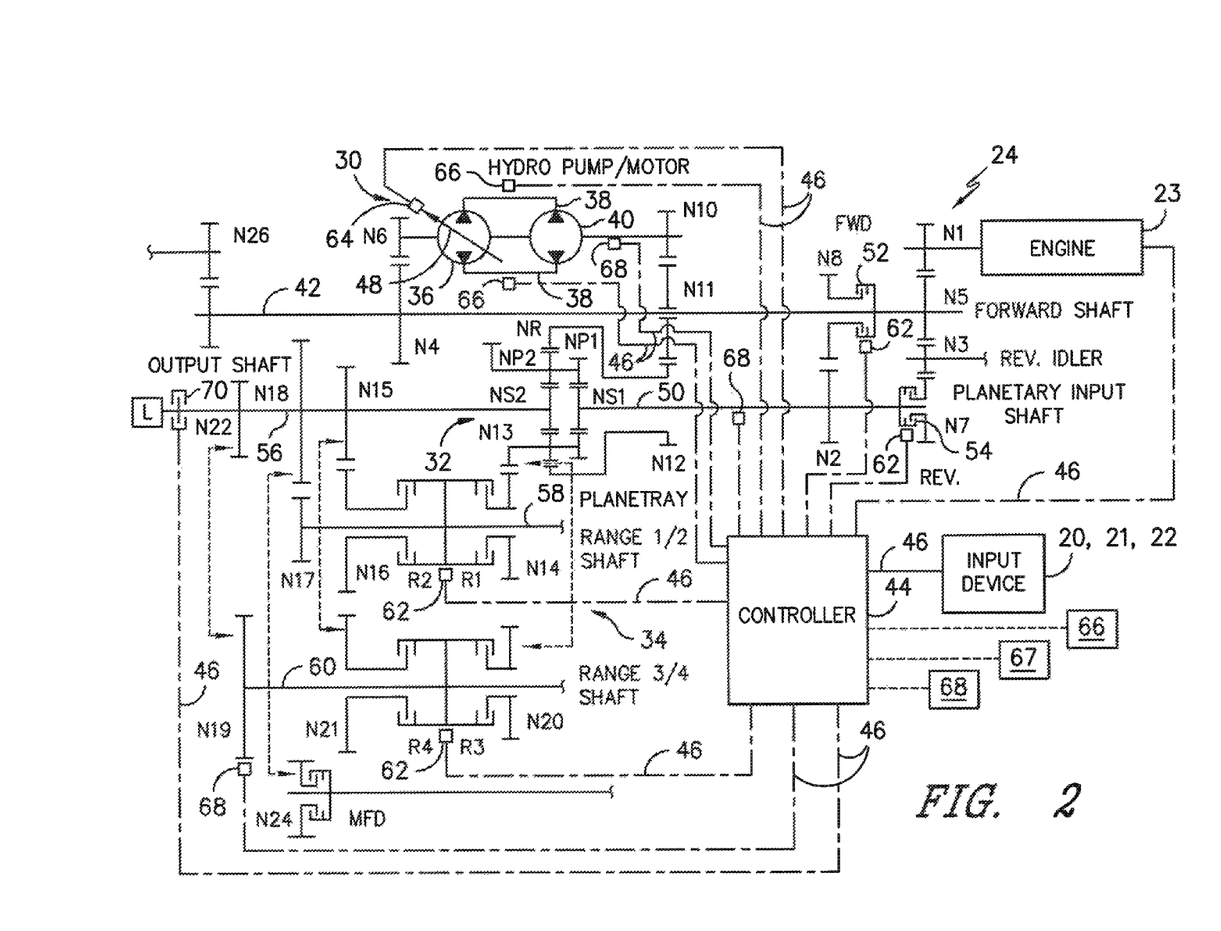
FIG. 2 illustrates a schematic view of a continuously variable transmission suitable for use within the work vehicle shown in FIG. 1 in accordance with one embodiment of the present disclosure.

Referring now to FIG. 2, a schematic diagram of one embodiment of a continuously variable transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10.

The hydrostatic power unit 30 of the transmission 10 may generally include a fluid pump 36 coupled by fluid conduits 38 in a closed loop to a fluid motor 40. The motor 40 may be coupled to the engine 23 via an input gear N6. Specifically, as shown in FIG. 2, power may be transmitted to the hydrostatic power unit 30 by a driven gear N4 mounted on a forward shaft 42 of the transmission 10 and engaged with the input gear N6. In addition, an output gear N10 for the hydrostatic power unit 30 may be connected to a ring gear NR of the planetary power unit 32 via gears N11 and N12. A power take off (PTO) of the vehicle 10 may also be coupled to the engine 23 through the forward shaft 42 (e.g., by coupling a PTO gear reduction N26 to the forward shaft 42, which is coupled to the engine 23 via gears N5 and N1.

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) and associated memory device(s) configured to perform a variety of computer-implemented functions. As used herein, the term "processor" refers not only to integrated circuits referred to in the an as being included in a computer, but also refers to a controller, a microcontroller, a microcomputer, a programmable logic controller (PLC), an application specific integrated circuit, and other programmable circuits. Additionally, the memory device(s) of the controller 44 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 44 to perform various computer-implemented functions, such as the method 200 described below with reference to FIG. 6. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shaft 50. As shown, the planetary input shaft 50 may be coupled to the engine 23 via a forward directional clutch 52 or a reverse directional clutch 54. In addition, the planetary power unit 32 may be configured to be selectively coupled to the load L, coupled to the hydrostatic power unit 30 and selectively coupled to the engine 23, all under automatic control of the controller 44. For example, for coupling the planetary power unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary power unit 32 via automatic operation of range selectors or clutches R1 and R2 for power flow through gears N13 and N14, or N15 and N16, respectively. Similarly, the range ¾ shaft 60 may be coupled to the planetary power unit 32 via range selectors or clutches R3 and R4 for power flow via gears N13 and N20, or N15 and N21, respectively. The range ½ and ¾ shafts 58, 60 may also be simultaneously coupled to the planetary power unit 32 to provide dual power flow. It should be appreciated that operation of the various clutches (e.g., the forward directional clutch 52, the reverse directional clutch 54, and clutches R1, R2, R3 and R4) may be automatically controlled by the controller 44 using suitable hydraulic actuators 62 (e.g., hydraulic pistons). Specifically, as will be described below, the controller 44 may be communicatively coupled to corresponding clutch control valves configured to control the supply of hydraulic fluid to each hydraulic actuator 62.

The controller 44 may also be communicatively coupled to a swash plate actuator 64 for automatically controlling the position or angle of the swash plate 48 of the pump 36. For example, the actuator 64 may be configured to move the swash plate 48 across a range of angles in response to control signals (e.g., current commands) received from the controller 44. In addition, the controller 44 may be coupled to any number of sensors for monitoring the various operating parameters of the transmission 24 including, but not limited to, pressure transducers or sensors 66 for sensing the pressure within the conduits 38 connecting the pump 36 to the motor 40 and/or for sensing the pressure of the hydraulic fluid supplied to each clutch of the transmission 24 (e.g., as will be described below with reference to FIG. 3), speed sensors 67 for sensing the output speed of the transmission 24, the speed(s) of the various clutches (and/or clutch cans) of the transmission 24 and/or the motor speed of the fluid motor 40, swashplate sensors 68 for monitoring the angle of the swashplate 48 and/or any other suitable sensors. Similarly, the controller 44 may also be connected to the engine 23 (e.g., a speed governor of the engine 23) for receiving engine speed data and other information therefrom.

Additionally, as shown in FIG. 2, the controller 44 may also be communicatively coupled to the operator-controlled input device(s) 20, 21, 22 positioned within the cab 18 via a suitable communicative link 46. For example, the controller 44 may be coupled to the FRNP lever 20, the clutch pedal 21, the display panel 22 and/or any other suitable input device of the vehicle 10 (e.g., the speed control lever or pedal, the engine throttle lever, the neutral button and/or any other suitable lever, pedal, button or control panel of the vehicle 10).

During operation, the transmission 24 may be operated to have a combined hydrostatic and mechanical power flow by engaging the reverse directional clutch 54 to the power planetary power unit 32 via gears N1, N3, N5 and N7, or engaging the forward directional clutch 52 to power the power planetary power unit 32 via gears N1, N8, and N2. Alternatively, the transmission 44 may be operated to have a pure hydrostatic power flow by disengaging both of the directional clutches 52, 54 and engaging a proper range clutch. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 44. For each speed range, substantially the full range of travel of the swash plate may be used. For example, in several embodiments, the swash plate 48 may be at one end of its range of travel for zero speed within a specific speed range, may be at the other end of its range of travel for the maximum speed of that speed range and may be at a zero tilt or neutral position within its range of travel for an intermediate speed of that same speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased.

In addition, for operation when the controller 44 is not powered or is not properly functioning, the parking brake 70 may also be configured to be engaged using a separate means. For instance, the parking brake 70 may be spring applied or may include any other suitable biasing means configured to bias the parking brake 70 into engagement. Alternatively, the parking brake 70 may include a suitable mechanical means for engaging the brake 70 when the controller 44 is not powered or is not properly functioning. Moreover, a means may be provided to store pressurized hydraulic fluid in the event the engine 23 stalls so that the parking brake 70 may remain released and/or may be applied and released several times if needed to control the vehicle 10 until the engine 23 can be restarted. Additionally, other means (e.g., a hand pump) may be provided to disengage the parking brake 70 if there is a fault and no stored pressurized hydraulic fluid is left within the system.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular CVT configuration shown in FIG. 2, but, rather, the present subject matter may be advantageously used with various different CVT configurations. Similarly, it should be appreciated that the present subject matter need not be limited to applications within CVTs. For example, the disclosed system and method may also be advantageously utilized with a power shift transmission (PST) or in any other suitable transmission.

Figure 3:
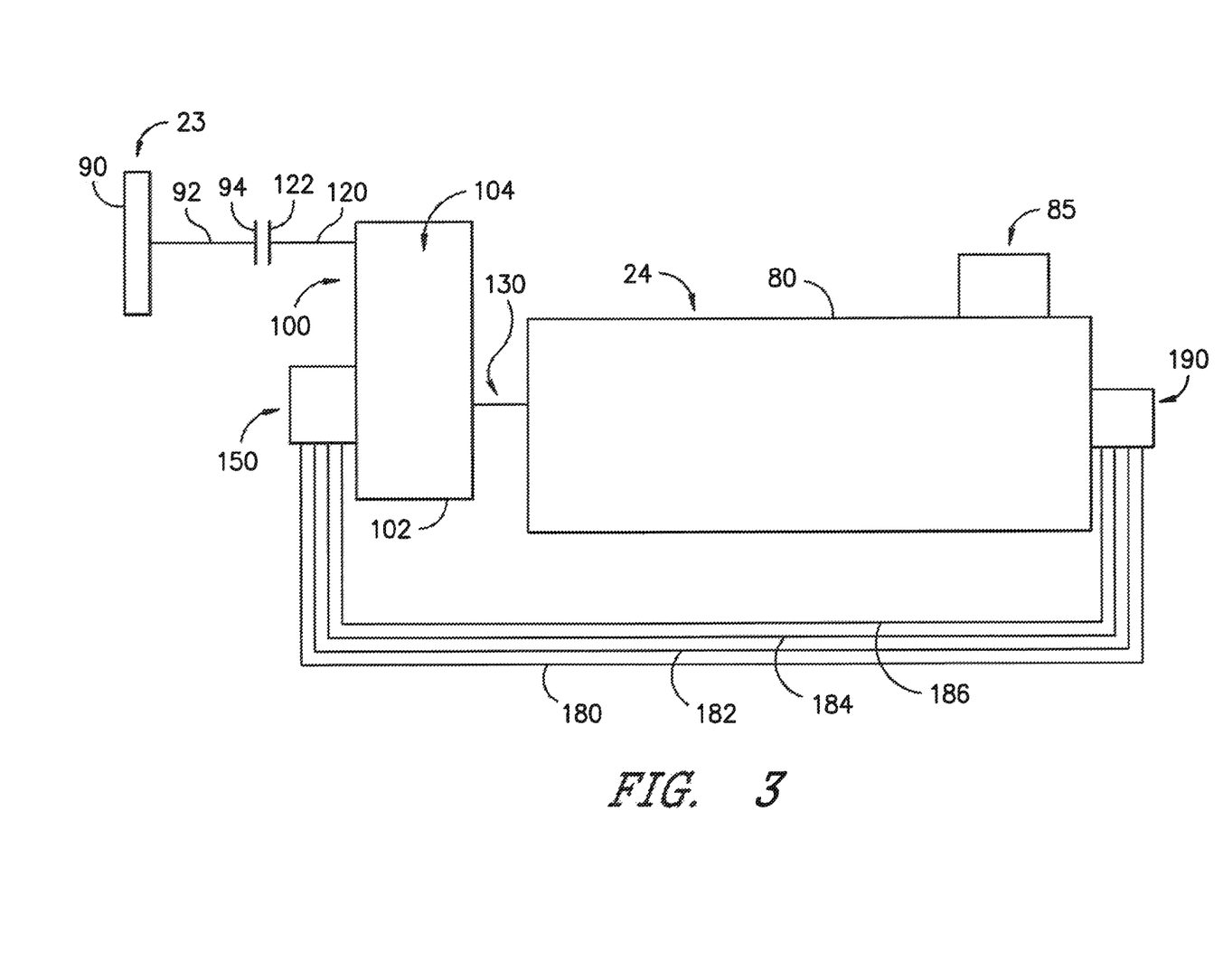
FIG. 3 is a schematic view of various components of a work vehicle and transmission thereof, including a main transmission body, dropbox, main pump and auxiliary pump in accordance with one embodiment of the present disclosure.

Referring now to FIGS. 3 through 9, various embodiments of transmissions 24 and dropbox assemblies 100 are disclosed. Transmission 24 in general may be any suitable transmission, including CVTs and PSTs as discussed above. A dropbox assembly 100 may be a component of the transmission 24. As shown in FIG. 3, transmission 24 may include a main transmission body 80 which houses various components of the transmission 24, such as various gears, shafts, etc. discussed above. A main pump 85 may additionally be included in transmission 24, and may for example be mounted to the main transmission body 80. Main pump 85 may, for example, correspond to pump 36 of FIG. 2. Dropbox assembly 100 may include a dropbox housing 102 which additionally houses various gears, shafts, etc. of the transmission. In particular, the dropbox housing 102 houses a gear assembly 110 which includes gears which initially transmit rotational power from the engine 23 to the rest of the transmission 24.

For example, gear assembly 110 may include an input gear 112 and an output gear 114, each of which may include gear teeth 113, 115 for rotatably meshing with other gears. In exemplary embodiments, gear assembly 110 further includes an idler gear 116 disposed between the input gear 112 and output gear 114. Gear teeth 117 of the idler gear 116 may mesh with the teeth 113 and teeth 115 to transmit rotational power between the input gear 112 and output gear 114. In other embodiments, however, the input gear 112 and output gear 114 may directly mesh, or other intermediate gears may be included between the input gear 112 and output gear 114.

Notably, and referring briefly again to FIG. 2, the gears 112, 114 and 116 may for example correspond with gears N5, N7 and N3 of the transmission shown in FIG. 2. In any case, the gear assembly 110 includes the initial gears that receive output rotational power from the engine 23, and specifically the flywheel 90 thereof, and which transmit this rotational power to the remainder of the transmission 24.

Flywheel 90 of engine 23 may be coupled to an engine output shaft 92 which is rotatable with the flywheel 90. The rotational power from the engine 23 may be transmitted through this shaft 92 to the gear assembly 110. For example, an input shaft 120 may be coupled to the input gear 112, such as via outer splines of the shaft 120 and inner splines of the gear 112 as is generally understood. The input shaft 120 may be connected to the output shaft 92, such as via flanges 94, 122, or the output shaft 92 may also serve as the input shaft 120. In any event, rotation of the flywheel 90 may cause rotation of the input shaft 120.

Figure 4:
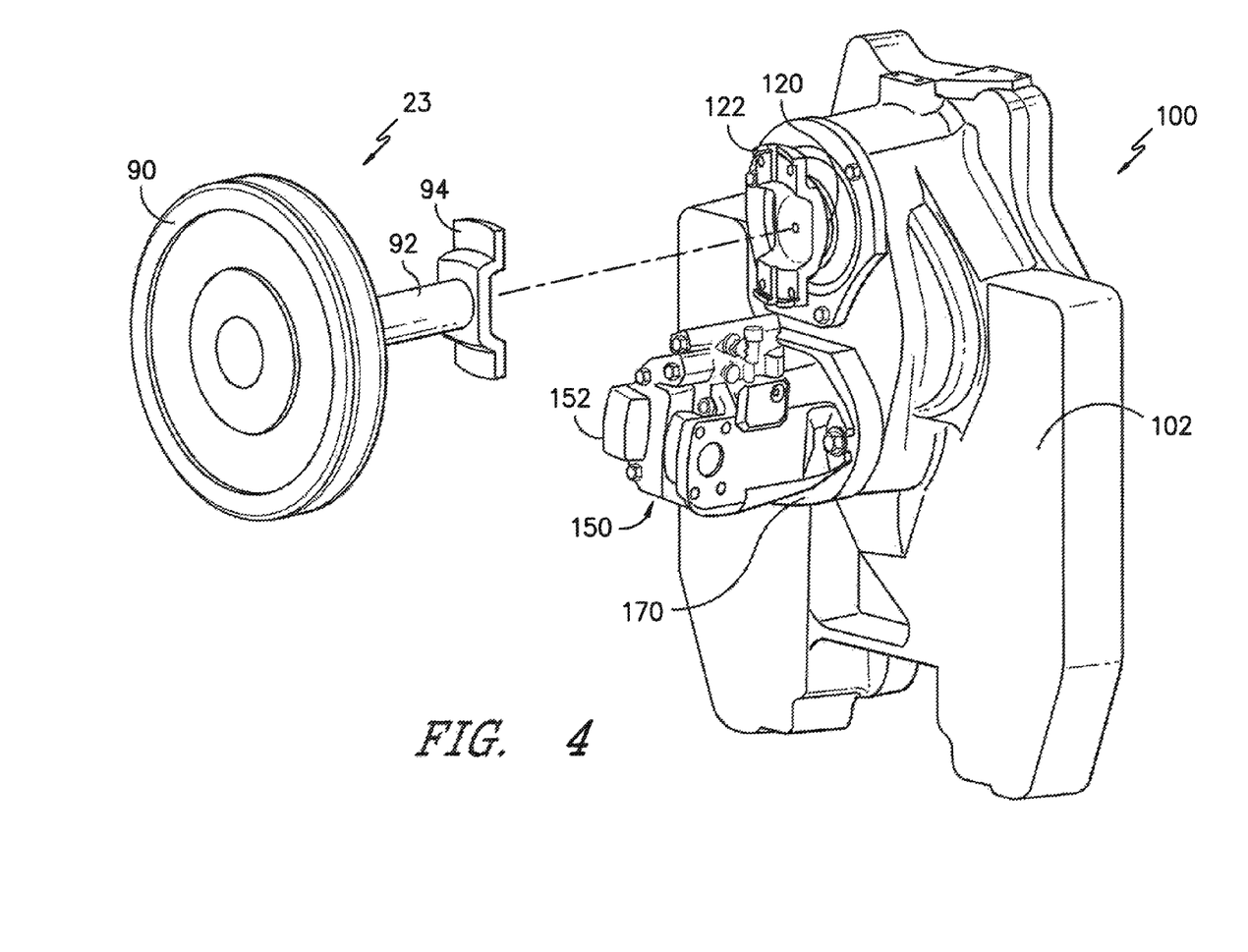
FIG. 4 is a perspective view of a dropbox assembly and an engine flywheel (shown exploded from the dropbox assembly) in accordance with one embodiment of the present disclosure.
Figure 5:
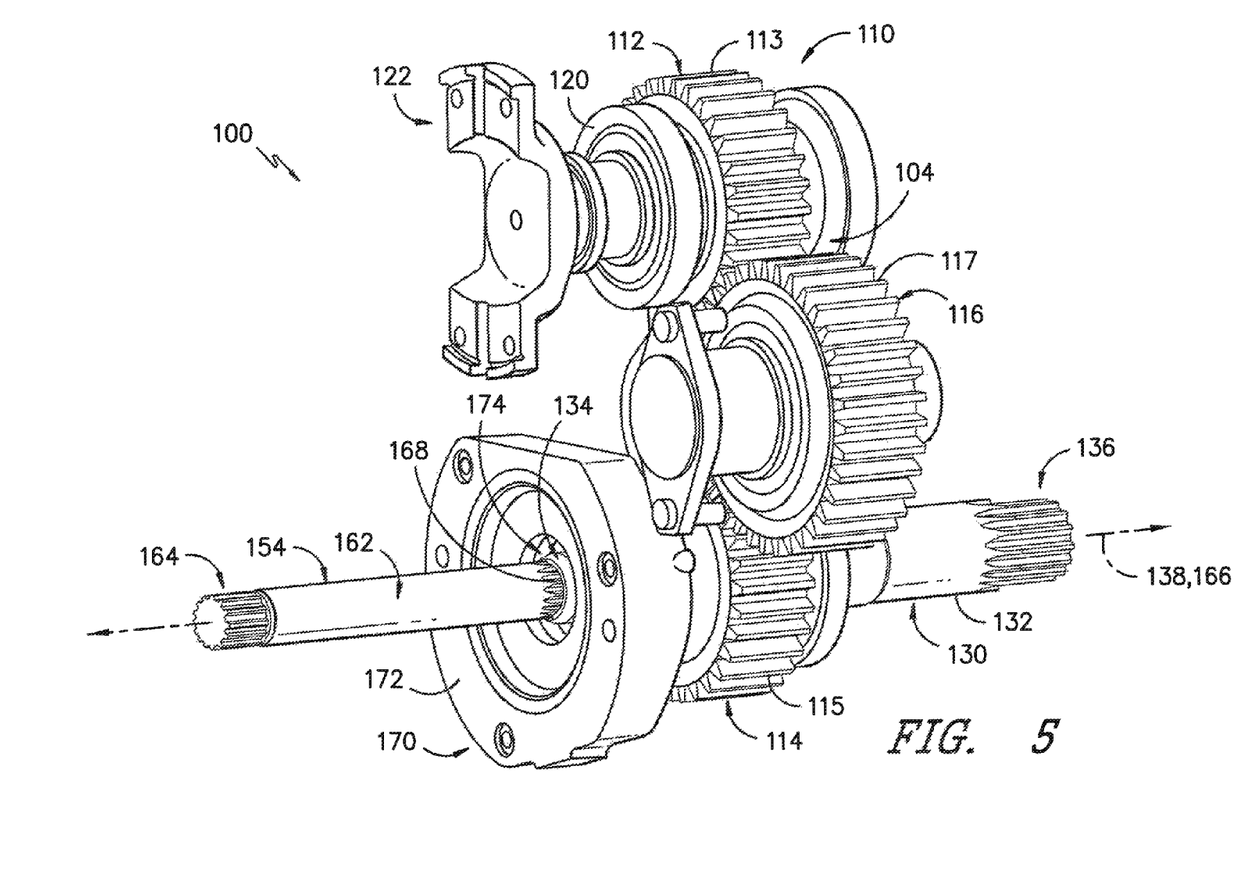
FIG. 5 is a perspective view of components of a dropbox assembly, with a dropbox housing removed for illustrative purposes, in accordance with one embodiment of the present disclosure.

Referring now to FIGS. 4 and 5, dropbox housing 102 may define an interior 104 in which gear assembly 110 may be disposed. Input shaft 120 may extend through the dropbox housing 102 to be coupled to input gear 112. Input gear 112 may be coupled to and rotatable with the input shaft 120, and may thus drive the gear assembly 110.

Dropbox assembly 100 may further include an output shaft 130. The output shaft 130 may be coupled to and rotatable with the output gear 114, and may thus transmit the rotational power from the engine 23 as transmitted through the gear assembly 110 to the remainder of the transmission 24.

Further, dropbox assembly 100 may include a pump 150, which in exemplary embodiments is an auxiliary pump 150 provided in addition to main pump 85. The pump 150 may be mounted to the dropbox housing 102, as discussed herein. Pump 150 may include, as shown, a pump housing 152 and a pump shaft 154. As discussed herein, the pump housing 152 may be disposed exterior to dropbox housing 102, and the pump shaft 154 may be coupled to and rotatable with the output shaft 130. For example pump shaft 154 or output shaft 130 may extend through dropbox housing 102 to facilitate such coupling.

Use of a pump 150 in accordance with the present disclosure may advantageously provide additional hydraulic power for use as required by work vehicle 10. For example, the additional hydraulic power provided by pump 150 can advantageously be utilized to power add-ons such as planters or seeders. Further, mounting of the pump 150 to the dropbox housing 102 advantageously locates the pump 150 in a convenient, easy to access and install (during production) location, thus facilitating efficient and cost-effective modification of the transmission 23. Still further such mounting of the pump 150 advantageously allows the pump 150 to be driven by output shaft 130, thus utilizing the existing rotational power transmission structure.

Referring now to FIGS. 5 through 9, various embodiments of components of dropbox assembly 100 as illustrated. For example, as shown, output shaft 130 includes a body 132 which has an inner surface 134 and outer surface 135 and which extends between a first end 136 and a second end 137, such as along a longitudinal or rotational axis 138. Further, the body 132 may define a bore 140 which extends into the body 132 from the first end 136 and which defines the inner surface 134. Output shaft 130 may further include various pluralities of splines extending from the surfaces of the body 132 to couple the shaft 130 to other rotational components. For example, a first plurality of outer splines 142 extending from the outer surface 135 may couple the output shaft 130 to inner splines (not shown) of the output gear 114. These splines 142 may be disposed proximate first end 136. A second plurality of outer spines 144 extending from the outer surface 135 may couple the output shaft 130 to inner splines of a suitable downstream (in the direction of power transmission from the engine 23) gear, shaft, etc. of transmission 24. These splines 144 may be disposed proximate second end 137. Further, a plurality of inner splines 146 may extend from the inner surface 134, such as proximate first end 136. These splines 146 may couple the output shaft 130 to the pump shaft 154.

Figure 6:
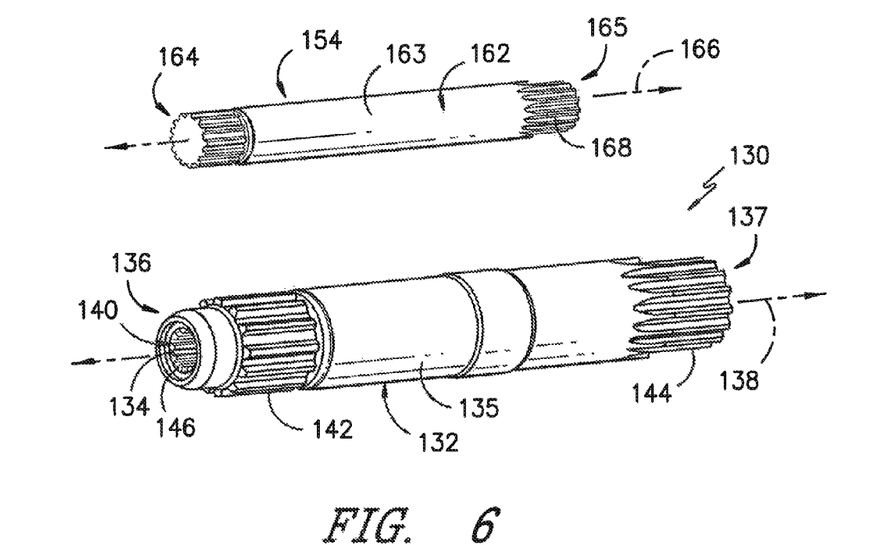
FIG. 6 is a perspective exploded view of a pump shaft and output shaft in accordance with one embodiment of the present disclosure.

For example, pump shaft 154 may have a body 162 which includes an outer surface 163 that extends between a first end 164 and a second end 165, such as along a longitudinal or rotational axis 166 (which may be coaxial with axis 138 when the shafts 154, 130 are coupled together). Further, a plurality of splines 168 may extend from the outer surface 163, such as proximate the second end 165. The second end 165 may extend into the bore 140 of the output shaft 130 such that the outer splines 168 mesh with the inner splines 146, thus coupling the shafts 154, 130 together.

It should be understood that the present disclosure is not limited to output shaft 130 having inner splines 146 and pump shaft 154 having outer splines 168 for such coupling. In other embodiments, output shaft 130 may have additional outer splines and pump shaft 154 may have corresponding inner splines. Still further, any suitable coupling of shafts 130, 154 is within the scope and spirit of the present disclosure.

Figure 7:
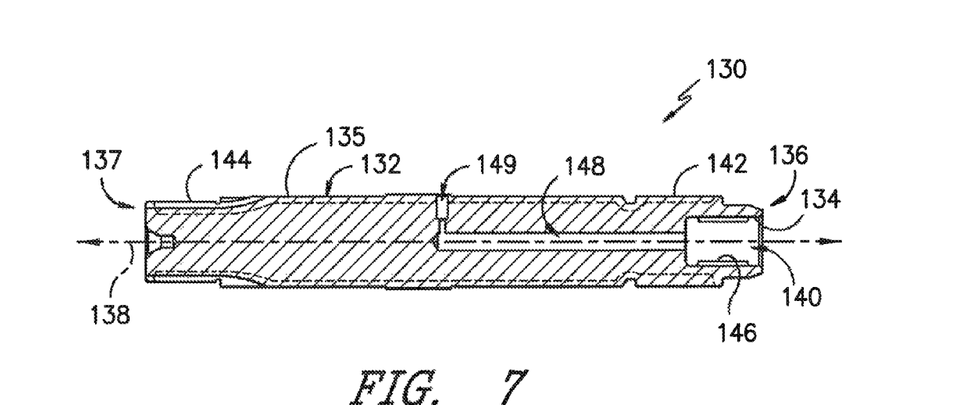
FIG. 7 is a cross-sectional view of an output shaft in accordance with one embodiment of the present disclosure.

Output shaft 130 may further include one or more lubrication passages defined in the body 132 for flowing a lubricant, such as oil, therethrough. This may allow the lubricant to lubricate the output shaft 130 and other components of the dropbox assembly 100 and transmission 24. For example, a first lubrication passage 148 may be defined in the body 132. This passage 148 may extend from the bore 140 towards the second end 137, such as along axis 138. A second lubrication passage 149 may additionally be defined in the body 132, and may be in fluid communication with the first lubrication passage 148. The second lubrication passage 149 may, for example, extend between the outer surface 135 and the first lubrication passage 148, such as transverse to the axis 138.

Figure 8:
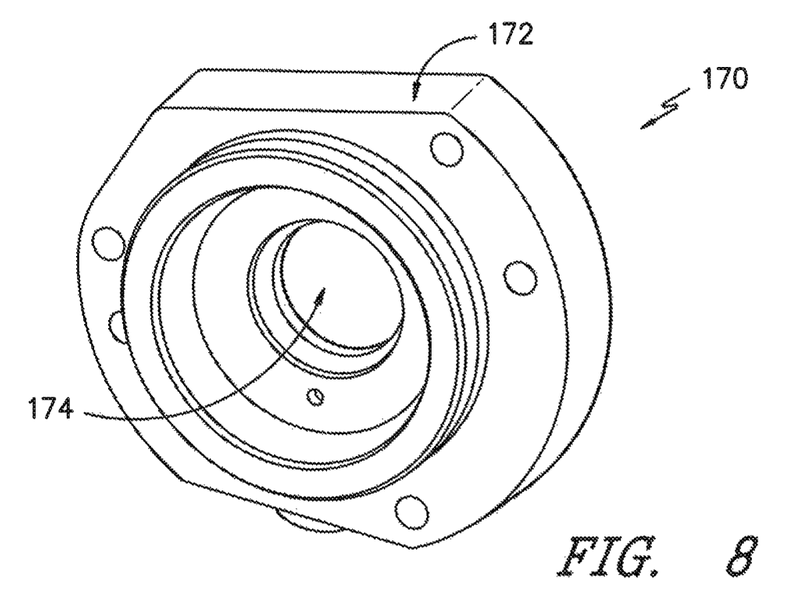
FIG. 8 is a perspective view of a cover in accordance with one embodiment of the present disclosure.

As discussed, pump 150 may be mounted to dropbox housing 102. For example, in some embodiments, pump housing 152 may be directly connected to the dropbox housing 102, such as through the use of suitable mechanical fasteners (i.e. nut/bolt combinations, screws, nails, rivets, etc.). In other embodiments as shown, a cover 170 may be positioned between the pump housing 152 and the dropbox housing 102. The pump housing 152 may be connected to the cover 170, and cover 170 may be connected to dropbox housing 102, such as each through the use of suitable mechanical fasteners. Cover 170 may include a body 172 which defines a shaft aperture 174. The output shaft 130 (as shown) or the pump shaft 154 may extend through the shaft aperture 174 to facilitate coupling of the pump shaft 154 and output shaft 130.

Figure 9:
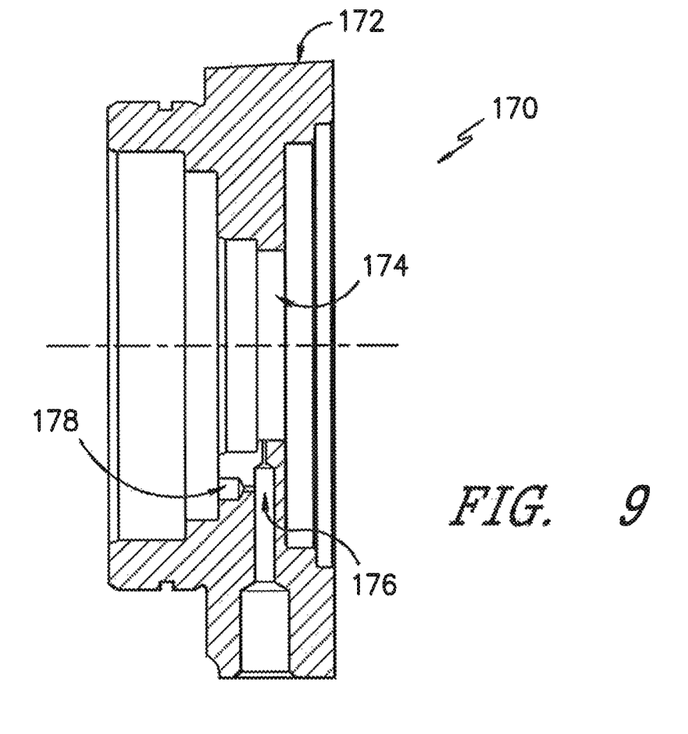
FIG. 9 is a cross-sectional view of a cover in accordance with one embodiment of the present disclosure.

Cover 170 may further include one or more lubrication passages defined in the body 172 for flowing a lubricant, such as oil, therethrough. This may allow the lubricant to lubricate components of the dropbox assembly 100 and transmission 24. For example, a first lubrication passage 176 may be defined in the body 172, and a second lubrication passage 178 may be defined in the body 172 in fluid communication with and transverse to the first lubrication passage 176. When assembled, second lubrication passage 178 may extend generally parallel to axes 138, 166, and may be in fluid communication with interior 104.

Referring again briefly to FIG. 3, as discussed, pump 150 may provide hydraulic power (which may be supplemental hydraulic power) for vehicle 10. Accordingly, pump 150 may further include various fluid lines extending from the pump housing 152. For example, a supply line 180, return line 182, drain line 184, and load sensing line 186 may all extend from pump housing 152, as may be generally understood. Further, pump 150 may include a manifold 190 which may connect to various other components of work vehicle 10, such as for example add-on components as discussed herein, for supplying hydraulic fluid to these components. Manifold may, for example, be mounted to the main transmission body 80. Various of the fluid lines, such as supply line 180, return line 182, drain line 184 and/or load sensing line 186, may be in fluid communication with manifold 190 and thus extend between pump housing 152 and manifold 190.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dropbox assembly for a transmission of a work vehicle, the dropbox assembly comprising:
   a dropbox housing defining an interior;
   a gear assembly disposed within the interior of the dropbox housing, the gear assembly comprising an input gear and an output gear;
   an output shaft coupled to and rotatable with the output gear, the output shaft comprising a body having an inner surface and an outer surface and extending between a first end and a second end, the body defining a bore extending into the body from the first end, the bore defining the inner surface, the output shaft further comprising a plurality of outer splines extending from the outer surface and a plurality of inner splines extending from the inner surface; and
   a pump mounted to the dropbox housing, the pump comprising a pump housing disposed exterior to the dropbox housing and a pump shaft, the pump shaft coupled to and rotatable with the output shaft.

2. The dropbox assembly of claim 1, wherein the pump shaft comprises a body having an outer surface and extending between a first end and a second end, the pump shaft further comprising a plurality of outer splines extending from the outer surface, the outer splines meshed with the inner splines of the output shaft.

3. The dropbox assembly of claim 1, wherein the output shaft further comprises at least one lubrication passage defined in the body.

4. The dropbox assembly of claim 3, wherein the at least one lubrication passage is a plurality of lubrication passages, the plurality of lubrication passages comprising a first lubrication passage and a second lubrication passage, the first lubrication passage defined in the body and extending from the bore towards the second end, the second lubrication passage defined in the body and extending between the outer surface and the first lubrication passage.

5. The dropbox assembly of claim 1, wherein the gear assembly further comprises an idler gear disposed between the input gear and output gear.

6. The dropbox assembly of claim 1, further comprising a cover positioned between the pump housing and the dropbox housing, the cover comprising a body defining a shaft aperture, the output shaft extending through the shaft aperture, the pump housing connected to the cover.

7. The dropbox assembly of claim 6, wherein the cover further comprises at least one lubrication passage defined in the body.

8. A transmission for a work vehicle, the transmission comprising:
   a main pump;
   an input shaft;
   a dropbox assembly comprising:
      a dropbox housing defining an interior;
      a gear assembly disposed within the interior of the dropbox housing, the gear assembly comprising an input gear and an output gear, the input gear coupled to and rotatable with the input shaft;
      an output shaft coupled to and rotatable with the output gear; and
      an auxiliary pump mounted to the dropbox housing, the auxiliary pump comprising a pump housing disposed exterior to the dropbox housing and a pump shaft, the pump shaft coupled to and rotatable with the output shaft.

9. The transmission of claim 8, further comprising a main transmission body, the main pump mounted to the main transmission body.

10. The transmission of claim 8, wherein the auxiliary pump further comprises a manifold and at least one fluid line extending between the pump housing and the manifold.

11. The transmission of claim 10, wherein the manifold is mounted to a main transmission body.

12. The transmission of claim 8, wherein the output shaft comprises a body having an inner surface and an outer surface and extending between a first end and a second end, the body defining a bore extending into the body from the first end, the bore defining the inner surface, the output shaft further comprising a plurality of outer splines extending from the outer surface and a plurality of inner splines extending from the inner surface.

13. The transmission of claim 12, wherein the pump shaft comprises a body having an outer surface and extending between a first end and a second end, the pump shaft further comprising a plurality of outer splines extending from the outer surface, the outer splines meshed with the inner splines of the output shaft.

14. The transmission of claim 12, wherein the output shaft further comprises at least one lubrication passage defined in the body.

15. The transmission of claim 14, wherein the at least one lubrication passage is a plurality of lubrication passages, the plurality of lubrication passages comprising a first lubrication passage and a second lubrication passage, the first lubrication passage defined in the body and extending from the bore towards the second end, the second lubrication passage defined in the body and extending between the outer surface and the first lubrication passage.

16. The transmission of claim 8, wherein the gear assembly further comprises an idler gear disposed between the input gear and output gear.

17. The transmission of claim 8, further comprising a cover positioned between the pump housing and the dropbox housing, the cover comprising a body defining a shaft aperture, the output shaft extending through the shaft aperture, the pump housing connected to the cover.

18. The transmission of claim 17, wherein the cover further comprises at least one lubrication passage defined in the body.

19. A dropbox assembly for a transmission of a work vehicle, the dropbox assembly comprising:
 a dropbox housing defining an interior;
 a gear assembly disposed within the interior of the dropbox housing, the gear assembly comprising an input gear and an output gear;
 an output shaft coupled to and rotatable with the output gear,
 a pump mounted to the dropbox housing, the pump comprising a pump housing disposed exterior to the dropbox housing and a pump shaft, the pump shaft coupled to and rotatable with the output shaft, the pump shaft comprising a body having an inner surface and an outer surface and extending between a first end and a second end, the body defining a bore extending into the body from the first end, the bore defining the inner surface, the pump shaft further comprising a plurality of inner splines extending from the inner surface.

20. The dropbox assembly of claim 19, wherein the output shaft comprises a body having an outer surface and extending between a first end and a second end comprising a plurality of outer splines extending therefrom, the output shaft further comprising a plurality of outer splines extending from the outer surface, the outer splines meshed with the inner splines of the pump shaft.

21. The dropbox assembly of claim 19, wherein the output shaft further comprises at least one lubrication passage defined in the body.

22. The dropbox assembly of claim 21, wherein the at least one lubrication passage is a plurality of lubrication passages, the plurality of lubrication passages comprising a first lubrication passage and a second lubrication passage, the first lubrication passage defined in the body and extending from the bore towards the second end, the second lubrication passage defined in the body and extending between the outer surface and the first lubrication passage.

23. The dropbox assembly of claim 19, wherein the gear assembly further comprises an idler gear disposed between the input gear and output gear.

24. The dropbox assembly of claim 19, further comprising a cover positioned between the pump housing and the dropbox housing, the cover comprising a body defining a shaft aperture, the output shaft extending through the shaft aperture, the pump housing connected to the cover.

25. The dropbox assembly of claim 24, wherein the cover further comprises at least one lubrication passage defined in the body of the cover.

\* \* \* \* \*